| United States Patent [19] | [11] Patent Number: 4,675,247 |
| Kitamura et al. | [45] Date of Patent: Jun. 23, 1987 |

[54] LAMINATED POLYPROPYLENE FILM

[75] Inventors: Shuji Kitamura, Nagaokakyo; Kiyohiko Nakae, Nishinomiya; Tadatoshi Ogawa; Teruaki Yoshida, both of Takatsuki; Hajime Sadatoshi, Ichihara, all of Japan

[73] Assignee: Sumitomo Chemical Company, Limited, Osaka, Japan

[21] Appl. No.: 685,537

[22] Filed: Dec. 24, 1984

[30] Foreign Application Priority Data

Dec. 29, 1983 [JP] Japan .................. 58-248302

[51] Int. Cl.⁴ ............................................. B32B 27/00
[52] U.S. Cl. ...................................... 428/349; 428/500; 428/516; 526/348.1
[58] Field of Search ................ 428/349, 516, 35, 500; 526/348.1, 348.2–348.6

[56] References Cited

U.S. PATENT DOCUMENTS

| 3,332,921 | 7/1967 | Cleary | 526/348.6 |
| 4,252,851 | 2/1981 | Lansbury | 428/349 |
| 4,294,889 | 10/1981 | Hashimoto . | |
| 4,360,650 | 11/1982 | Desvignes et al. | 526/348.6 |
| 4,410,672 | 10/1983 | Inazawa | 526/348.6 |
| 4,464,426 | 8/1984 | Anthony | 428/349 |

FOREIGN PATENT DOCUMENTS

| 145713 | 11/1980 | Japan | 428/349 |
| 2027720 | 2/1980 | United Kingdom . | |
| 2040964 | 9/1980 | United Kingdom . | |

*Primary Examiner*—Edith Buffalow
*Attorney, Agent, or Firm*—Stevens, Davis, Miller & Mosher

[57] ABSTRACT

A laminated polypropylene film consisting of a crystalline polypropylene layer having laminated to at least one side thereof a copolymer layer, said copolymer being a random copolymer of propylene and an α-olefin having 4 or more carbon atoms or a random copolymer of propylene, an α-olefin having 4 or more carbon atoms and ethylene obtained by vapor phase polymerization in the substantial absence of a liquid medium and satisfying the following conditions (1) to (4):

(1) the content of an α-olefin having 4 or more carbon atoms in the copolymer is 8 to 25 mole %, (2) the content of ethylene in the copolymer is 3 mole % or less, (3) the content of a cold xylene-soluble portion in the copolymer is 15 to 60% by weight, and (4) the content of a boiling n-heptane-insoluble portion in the copolymer is 7% by weight or more.

Said laminated film has an excellent low-temperature heat-sealability, an excellent transparency, a low blocking and a good scratch resistance.

4 Claims, No Drawings

LAMINATED POLYPROPYLENE FILM

This invention relates to a laminated polypropylene film having an excellent low-temperature heat-sealability, an excellent transparency, a low blocking and a good scratch resistance.

Biaxially stretched films of crystalline polypropylene are in wide use as packaging films because of their excellent transparency and rigity. Although the above films per se have originally a heat-sealability, a very high temperature is required for the heat-sealing, and moreover, shrinkage, wrinkles, etc. are caused during the heat-sealing. Therefore, they are not used alone, and there are widely used laminated films obtained by laminating a low-temperature heat-sealable resin to one or both sides of a biaxially stretched film of crystalline polypropylene by coating, laminating or co-extruding. What is required for this heat-sealable resin is to what extent the heat-sealing temperature can be lowered, and this is important because the lower the temperature, the higher the bag-making speed of the laminated film can be made. However, it is not sufficient that the heat-sealing temperature is merely low, and, needless to say, other characteristics such as transparency, scratch resistance, blocking resistance and the like are important.

Various heat-sealable resins have heretofore been proposed. However, in fact, none of them satisfy all of the above characteristics. That is to say, polypropylene films to which a polyethylene or an ethylenevinyl acetate copolymer is laminated have a relatively good, but not satisfactory, low-temperature heat-sealability and moreover are inferior in transparency and scratch resistance. As a polypropylene type resin, there is a propylene-ethylene random copolymer containing about 5% by weight of ethylene. This copolymer is excellent in transparency, scratch resistance and blocking resistance, but very poor in low-temperature heat-sealability. The low-temperature heat-sealability of this propylene-ethylene random copolymer can be improved by increasing the ethylene content of the copolymer. However, the increase of ethylene content deteriorates the transparency of the copolymer. As other polypropylene type resins, a propylene-butene-1 random copolymers have long been known as heat-sealable resins. British Pat. No. 1,018,341 discloses propylene-butene-1 copolymers containing 25 to 80 mole % of butene-1 which are obtained by polymerization in an inert solvent. This copolymer is highly sticky and accordingly very poor in blocking resistance. U.S. Pat. 4,252,851 and U.K.P. No. 2,027,720 disclose propylene-butene-1 copolymers obtained by polymerization in an inert solvent (so-called slurry polymerization) and freed of the components soluble in the solvent. These copolymers are good in transparency, scratch resistance and blocking resistance. However, they are not satisfactory, though relatively good, in low-temperature heat-sealability as compared with the level aimed at in the present invention. Japanese Patent Application Kokai (Laid-Open) Nos. 66,990/79, 114,887/78 and 138,720/83 disclose propylene-butene-1 copolymers which are obtained by polymerization in the liquid phase with a specific catalyst system under the conditions that the copolymer formed is dissolved. However, said copolymers require as an essential condition that the boiling n-heptane-insolubles content is 5% by weight or less. The present inventors' duplication tests have clarified that they are certainly satisfactory in low-temperature heat-sealability and transparency, but very poor in scratch resistance and blocking resistance and have no practical applicability. For the purpose of solving the problem of poor scratch resistance and poor blocking resistance, there are known methods wherein a small or large amount of an isotactic polypropylene is incorporated into the above propylene-butene-1 copolymers (Japanese Patent Application Kokai (Laid-Open) No. 58,861/81 and U.S. Pat. No. 4,186,240). However, when the amount of an isotactic polypropylene incorporated is small, the abovementioned drawbacks are not sufficiently eliminated and, when the amount is large, the merit of low-temperature heat-sealability is lost. Further, U.S. Pat. No. 4,360,650 discloses that a propylene-butene-1 copolymer having a specific sequence distribution can be obtained by copolymerizing propylene and butene-1 in the presence of a catalyst system consisting of a $TiCL_3$-based solid compound and an organometallic compound but in the absence of any liquid diluent. This copolymer is not so good in low-temperature heat-sealability, is poor in blocking resistance and becomes inferior in transparency with the lapse of time.

As the other polypropylene type resins, there are known propylene-ethylene-butene-1 terpolymers (Japanese Patent Application Kokai (Laid-Open) Nos. 120,716/81 and 11,281/77). In these terpolymers, the components soluble in an inert solvent have been removed because slurry polymerization is used, or, the terpolymers contain such a relatively large amount of ethylene that the ethylene content is 6 mole %, and hence, the low temperature heat-sealability is poor.

In view of the above situation, the present inventors have conducted extensive study for the purpose of developing a laminated polypropylene film having an excellent low-temperature heat-sealability and having a transparency, scratch resistance and blocking resistance. As a result, they have found that the above purpose can be attained by a laminated polypropylene film consisting of a polypropylene substrate layer having laminated to at least one side thereof a heat-sealable copolymer layer which has been obtained by a specific polymerization method using a specific catalyst system, and which comprises a specific amount of a specific comonomer as the main component, has a specific amount of a cold xylene-soluble portion (CXS) and a specific amount of a boiling n-heptane-insoluble portion (BHIP).

According to this invention, there is provided a laminated polypropylene film consisting of a crystalline polypropylene layer having laminated to at least one side thereof a layer of a random copolymer of propylene and an α-olefin having 4 or more carbon atoms or a random copolymer of propylene, an α-olefin having 4 or more carbon atoms and ethylene, which copolymer has been obtained by vapor phase polymerization in the substantial absence of a liquid medium and (c) satisfies the following conditions (1) to (4):

(1) the content of an α-olefin having 4 or more carbon atoms in the copolymer is 8 to 25 mole %, (2) the content of ethylene in the copolymer is 3 mole % or less, (3) the content of a cold xylene-soluble portion in the copolymer is 15 to 60% by weight, and (4) the content of a boiling n-heptane-insoluble portion in the copolymer is 7% by weight or more.

The first feature of the laminated film according to this invention is that the film is excellent in low-temperature heat-sealability. The second feature is that the film is also excellent in transparency, scratch resistance and blocking resistance in spite of its first feature.

The copolymer used in the laminated film of this invention as a resin for imparting thereto a heatsealability must be produced by the so-called vapor phase polymerization method. This is because in the slurry polymerization method which is widely used and carried out in an inert hydrocarbon, a large amount of the resulting polymer dissolves in the inert hydrocarbon solvent, which makes the polymerization very difficult, makes it difficult to produce a polymer meeting the object of this invention and also greatly reduces the yield of polymer. Therefore, the slurry polymerization is economically disadvantageous. The polymerization in this invention can be carried out in a fluidized bed type reactor, a fluidized bed type reactor provided with a stirrer, or the like, all of which are known. Also, it is essential that the polymerization be carried out under such temperature and pressure conditions that the gas is not liquefied and polymer particles are not melted to form a mass in the reactor. Particularly preferable polymerization conditions are such that the temperature is 40° to 100° C. and the pressure is 1 to 50 kg/cm$^2$ (pressure at gauge; hereinafter referred to as G). Further, it is preferable to add a molecular weight regulating agent such as hydrogen or the like for the purpose of adjusting the melt flow property of the polymer obtained. Polymerization can be carried out batchwise, continuously or in combination of the two, and a monomer and a molecular weight regulating agent which are consumed in polymerization can be supplied to the reactor continuously or intermittently. The copolymer for use in this invention may be washed, after polymerization, with an alcohol, a hydrocarbon solvent or the like for the purpose of removing the residual catalyst or low-molecular weight polymers.

The catalyst system used in this invention for the production of a copolymer used as a resin for imparting a heat-sealability may be a known catalyst for stereoregular polymerization of α-olefins, and includes the so-called Ziegler-Natta catalysts, namely catalysts consisting of a compound of a transition metal of Groups IV to VIII of the Periodic Table and an organic compound of a typical metal of Groups I to III of the Periodic Table, for example, a catalyst system consisting of (a) a solid catalyst component such as a catalyst containing $TiCl_3$ or $TiCl_3.1/3AlCl_3$ as the main component or a carrier-supported catalyst wherein a Ti compound is supported on magnesium chloride, (b) an organo-aluminum catalyst and (c) a third component such as an electron-donating compound or the like. It is preferable that the transition metal compound or a catalyst component containing the compound be a solid. As the transition metal compound, preferred are compounds containing at least titanium and a halogen, among which halogen compounds of titanium represented by the formula $Ti(OR)_nX_{m-n}$ wherein R is a hydrocarbon group having 1 to 20 carbon atoms, X is a halogen, m is a number of from 2 to 4 and n is a number of from 0 to m-1. Specific examples of such compounds are $TiCl_4$, $TiCl_3$, $TiCl_2$, $Ti(OC_2H_5)Cl_3$, $Ti(OC_6H_5)Cl_3$, etc The transition metal compound per se may be the main component of the catalyst or alternatively, it may be used as a catalyst component supported on an appropriate carrier.

In this invention, $TiCl_3$ among the halogenocompounds of titanium is one of the most preferred transition metal compounds. It is known that this compound has α, β, γ and δ crystal forms. In order for an α-olefin of 3 or more carbon atoms to undergo stereoregular polymerization, $TiCl_3$ of the α, γ or δ type having a layer-like crystal form is preferred. $TiCl_3$ is generally obtained as a $TiCl_3$ composition by reducing $TiCl_4$ with hydrogen, matallic aluminum, metallic titanium, an organoaluminum compound, an organomagnesium compound or the like. Preferable $TiCl_3$ compositions are a so-called $TiCl_3$ AA obtained by reducing $TiCl_4$ with metallic aluminum and activating the resulting product by mechanical grinding, etc. and a $TiCl_3$ composition obtained by reducing $TiCl_4$ with an organoaluminum compound and activating the resulting product with a complexing agent and a halogen compound. In this invention, the latter $TiCl_3$ composition is particularly preferred. For the transition metal compound, there can also preferably be used an alkoxy group-containing trivalent titanium halide obtained by reducing $Ti(OR)_4$ (wherein R is a hydrocarbon group of 1 to 20 carbon atoms) with an organoaluminum compound and then treating the resulting product with an ether compound and $TiCl_4$.

A particularly preferable $TiCl_3$ composition or alkoxy group-containing trivalent titanium halide is such as to be able to produce at least 6,000 g of a polypropylene per gram when a system containing a liquefied propylene, hydrogen, diethylaluminum chloride and the $TiCl_3$ composition or the alkoxy group-containing trivalent titanium halide is subjected to polymerization at 65° C. for 4 hr. Such a $TiCl_3$ composition can be produced by the methods disclosed in U.S. Pat. No. 4,210,738 and 4,165.,298, Japanese Patent Application Kokai (Laid-Open) No. 142,904/83, Japanese Patent Application No. 138,471/83, etc. Also, such an alkoxy group-containing trivalent titanium halide can be produced by the methods disclosed in Japanese Patent Application Kokai (Laid-Open) No. 126,401/84, etc.

When the transition metal compound is used as the catalyst component supported on an appropriate carrier, the carrier may be various solid polymers, particularly, α-olefin polymers; various solid organic compounds, particularly, solid hydrocarbons; various solid inorganic compounds, particularly, oxides, hydroxides, carbonates and halides; and so forth. Preferable carriers are magnesium compounds such as magnesium halides, magnesium oxides, magnesium hydroxides, magnesium hydroxyhalides and the like. These magnesium compounds may be used as a complex with other solid substances mentioned above. As the magnesium compounds, commercially available ones may be used as they are, but preferred are those obtained by mechanically grinding a commercially available magnesium compound or by dissolving it in a solvent and then allowing it to precipitate or by treating it with an electron-donating compound or an active hydrogen compound, or by decomposing an organomagnesium compound such as a Grignard reagent. In many cases, these procedures for obtaining a preferable magnesium compound are preferably used in combination. These procedures may be conducted at the time of the production of a carrier or the catalyst component. Particularly preferable magnesium compounds are magnesium halides, and particularly preferable transition metal compounds are titanium halides as mentioned above. Therefore, a carrier-supported catalyst component composed essentially of a magnesium halide and a titanium halide is one of the most preferred catalyst components in this invention and can be produced by the methods disclosed in Japanese Patent Application Kokai (Laid-Open) No.

30,407/81, Japanese Patent Application Kokai (Laid-Open) No. 59,915/82, etc.

For stereoregular polymerization of an α-olefin having 3 or more carbon atoms, it is preferable to use a carrier-supported catalyst component comprising a magnesium halide and halogen as the essential component and also comprising an electron-donating compound.

As the organic compound of a typical metal of Groups I to III of the Periodic Table, organoaluminum compounds are preferred. Particularly preferred are organoaluminum compounds represented by the formula $R_eAlX_{3-e}$ wherein R is a hydrocarbon group having 1 to 20 carbon atoms, X is a hydrogen atom or a halogen atom and e is a number of 1 to 3. Specific examples of these compounds are triethylaluminum, triisobutylaluminum, diethylaluminum hydride, diethylaluminum chloride, diethylaluminum bromide, ethylaluminum sesquichloride, ethylaluminum dichloride, etc. The most preferable compounds are triethylaluminum, diethylaluminum chloride and their mixture.

The electron-donating compound includes esters and acid anhydrides such as ethyl acetate, ε-caprolactone, methyl methacrylate, ethyl benzoate, ethyl p-anisate, methyl p-toluate, phthalic anhydride; ether compounds such as di-n-butyl ether, diphenyl ether, diethylene glycol dimethyl ether and the like; organophosphorus compounds such as tri-n-butyl phosphite, triphenyl phosphite and hexamethylene phosphoric triamide; etc. Further, it includes ketones; amines; amides; thioethers; organosilicon compounds such as alkoxysilanes and aryloxysilanes both having a Si—O—C bond; etc.

The solid catalyst component may be treated, before its use in the vapor phase polymerization of this invention, with a small amount of an olefin in the presence of an organoaluminum compound alone or together with an electron-donating compound to undergo pre-polymerization.

In the copolymer used as a resin for imparting a heat-sealability in this invention, an α-olefin having 4 or more carbon atoms or a combination of the α-olefin and a very small amount of ethylene is used as comonomers. As the α-olefin having 4 or more carbon atoms, there may be used butene-1, pentene-1, hexene-1, 4-methylpentene-1 or the like alone or in admixture of two or more, and among them, butene-1 is most preferable because it is difficult to liquefy and a high partial pressure can be obtained. When the major component of the comonomer is ethylene or even when the major component of the comonomer is an α-olefin having 4 or more carbon atoms if the ethylene content exceeds a specific level, there occur in the laminated film of this invention, deterioration of transparency and the deterioration of transparency with the lapse of time which seems to be due to the bleeding of an atactic component are caused, so that such conditions are not desirable.

The content of an α-olefin having 4 or more carbon atoms in the copolymer used in this invention as a resin for imparting a heat-sealability is 8 to 25 mole %, preferably 10 to 24 mole %. If the content of an α-olefin having 4 or more carbon atoms is smaller than the abovementioned lower limit, the laminated film of this invention does not possess a sufficiently improved heat-sealability. If the α-olefin content exceeds the above upper limit, the laminated film becomes poor in blocking resistance and, in the production of the copolymer by vapor phase polymerization, the state of powder becomes bad (tends to be melted to form a mass), which makes the stable production of the copolymer difficult. The ethylene content in the copolymer used in this invention as a resin for imparting a heat-sealability is 3 mole % or less, preferably 2.5 mole % or less. If the ethylene content exceeds the above-mentioned upper limit, the transparency of the laminated film is deteriorated with the lapse of time. Although the reason therefor is not clear, bleeding of an atactic component seems to be a cause thereof.

The content of the cold xylene-soluble portion (CXS) in the copolymer used in this invention as a resin for imparting a heat-sealability is 15 to 60% by weight, preferably 17 to 50% by weight. If the CXS content is less than the above-mentioned lower limit, the laminated film does not possess a sufficiently improved low-temperature heat-sealability and, in the production of the copolymer, its yield is low. If the CXS content exceeds the above-mentioned upper limit, the laminated film has poor blocking resistance and, in the production of the copolymer by vapor phase polymerization, the state of powder becomes bad (tends to be melted to form a mass), which makes the polymerization substantially impossible.

The content of the boiling n-heptane-insoluble portion (BHIP) in the copolymer used in this invention as a resin for imparting a heat-sealability is 7% by weight or more, preferably 10% by weight or more. If the content is smaller than the above-mentioned lower limit, the blocking resistance and scratch resistance of the laminated film become poor.

The Δhaze of the copolymer used in this invention as a resin for imparting a heat-sealability is preferably 7% or less, more preferably 5% or less, most preferably 4% or less. If the Δhaze exceeds the upper limit, the deterioration of transparency of the laminated film with the lapse of time is caused and the blocking resistance of the laminated film becomes bad.

When the copolymer used in this invention as a resin for imparting a heat-sealability is produced by the vapor phase polymerization method, after the polymerization, the copolymer may or may not be subjected to a moderate post-treatment such as washing or the like. In any case, it is sufficient that the copolymer is in the above-defined range at the time of its use.

The copolymer used in this invention as a resin for imparting a heat-sealability may be blended with at most about 20% by weight of a rubbery ethylene-α-olefin random copolymer and also with a small amount of other polymer materials. Further, the copolymer may contain additives such as an antistatic agent, an antiblocking agent, a slipper, and a stabilizer and the like.

The laminated polypropylene film of this invention can be produced by laminating the above-mentioned resin for imparting a heat-sealability to one or both sides of a crystalline polypropylene film which is a substrate, by a known method. The lamination method includes a method wherein a substrate layer and a preformed sheet of a resin for imparting a heat-sealability are simultaneously passed through a pressure roller while interposing an adhesive between the two, a method wherein a substrate layer is coated with a solution or dispersion of a resin for imparting a heat-sealability in a solvent such as toluene or the like, a method wherein a substrate layer is coated with a resin for imparting a heat-sealability by melt extrusion, and a method wherein a resin for imparting a heat-sealability and a substrate polymer are separately extruded by different extruders and then they are bonded in a common die or at its outlet while they are still in a molten state.

The laminated film of this invention is preferably oriented uniaxially or biaxially after lamination. Such a stretched laminated polypropylene film can be produced by one of the following known methods: (1) a method wherein a polypropylene and a resin for imparting a heat-sealability are made into a composite in an extrusion die for sheet formation or near its outlet while they are still in a molten state and the raw laminated sheet obtained by this co-extrusion is then stretched biaxially, (2) a method wherein a resin for imparting a heat-sealability is extrusion-laminated to a polypropylene substrate and then the resulting laminate is biaxially stretched, and (3) a method wherein a polypropylene substrate is previously stretched uniaxially in the machine direction in a heated state by the use of a plurality of rolls including metal rolls and, to the sheet is extrusion-laminated a resin for imparting a heat-sealability, and thereafter the resulting laminate is stretched in the transverse direction.

The laminated polypropylene film thus produced is very excellent in low-temperature heat-sealability, and also excellent in transparency, blocking resistance and scratch resistance. Moreover, the film can be produced at a low cost. Hence, the film has a very high practical value.

This invention will be explained in more detail below referring to Examples. However, it should no be interpreted that the invention be limited to the Examples.

The data and evaluation values in the Examples and Comparative Examples were obtained in the following ways.

(1) α-Olefin content in copolymer

It was obtained from material balance. As for the content of butene-1, the material balance was confirmed by determining the amount of butene-1 in the usual way based on the characteristic absorption at 770 cm$^{-1}$ obtained with an infrared spectrometer. Incidentally, in the measurement by means of an infrared spectrometer, a calibration curve of a propylene-butene-1 copolymer was prepared from the amounts determined by means of $^{13}$C-NMR, and the determination of the amount of butene-1 was made based thereon.

(2) Ethylene content in copolymer

It was obtained from material balance. Further, the determination of the amount of ethylene was conducted in the usual way based on the characteristic absorptions at 732 cm$^{-1}$ and 720 cm$^{-1}$ obtained with an infrared spectrometer, whereby the result of the material balance was confirmed. Incidentally, in the measurement by means of an infrared spectrometer, a calibration curve of an ethylene copolymer was prepared based on the amounts determined by the radiation measurement of $^{14}$C-labelled ethylene copolymer, and the determination of the amount of ethylene was made based thereon.

(3) Cold xylene-soluble portion (CXS)

In 500 ml of xylene was dissolved 5 g of a polymer, and the mixture was gradually cooled down to room temperature. Then, the mixture was allowed to stand in a bath at 20° C. for 4 hr and thereafter filtered, and the filtrate was concentrated to dryness and dried. The solid thus obtained was weighed.

(4) Boiling n-heptane-insoluble portion (BHIP)

Extraction was conducted for 14 hr by the use of a Soxhlet extractor. The frequency of refluxing was once every 5 min. The extraction residue was dried and weighed to obtain a BHIP.

(5Intrinsic viscosity ([η])

Viscosities were measured at different concentrations of 0.4, 0.2, 0.133 and 0.1 g/dl in the usual way in Tetralin at 135° C.

(6) ΔHaze

A press sheet of a copolymer with a thickness of 100 μwas prepared and annealed at 60° C. for 9 hr. ΔHaze was expressed as a difference between the haze values before and after annealing. The haze was determined by the method mentioned in the next item (7).

(7) Haze

It was obtained in accordance with ASTM-D1003.

(8) Heat-sealing temperature

Two sheets of a laminated film were arranged so that the respective laminate surfaces face each other, and to the resulting assembly was applied a load of 2 kg/cm$^2$G at a predetermined temperature for 2 sec to press-bond the two sheets, thereby obtaining a sample of 25 mm in width. This sample was subjected to peeling under the conditions that the peel rate was 200 mm/min and the peel angle was 180°. The temperature at which the peel resistance obtained was 300 g/25 mm was taken as the heat-sealing temperature.

(9) Blocking

A blocked test piece obtained by heat-treating under a load of 500 g/12 cm$^2$ at 60° C. for 3 hr. was subjected to shear peeling. A maximum load (kg) obtained at that time is expressed in a unit of kg/12 cm$^2$ to indicate the blocking.

(10) Scratch resistance

A laminated film was folded so that the layer of a resin for imparting a heat-sealability was inside, and then vigorously rubbed by hand 5 times. The extent of damage of the inside was evaluated in three levels (o, Δ, X).

EXAMPLE 1

(1) Preparation of a titanium trichloride-containing solid catalyst

A 1-liter flask provided with a stirrer and a dropping funnel was purged with argon. A solution consisting of 60 ml of titanium tetrachloride and 228 ml of n-heptane was then placed in the flask, and a solution of 136.6 ml of ethyl-aluminium sesquichloride and 300 ml of n-heptane was dropped thereinto at a temperature of −5° to −10° C. over a period of 2 hours. After completion of the dropping, the resulting mixture was stirred at room temperature for 30 minutes, and then the temperature of the mixture was raised to 80° C. The mixture was subjected to heat treatment at 80° C. for 1 hour, and then allowed to stand at room temperature to separate it into a solid and a liquid. The solid obtained was then washed with four 400-ml portions of n-heptane.

Subsequently, 580 ml of n-heptane and 5 ml of diethylaluminum chloride were placed in the flask, and the temperature of the contents of the flask was maintained at 50° C. While stirring the contents, 32 g of propylene was slowly fed to the resulting suspension at 50° C. over a period of 2 hours, and the pre-polymerization treatment of propylene was conducted. After the treatment, the pre-polymerization mixture was separated into a solid and a liquid, and the solid obtained was washed with two 400-ml portions of n-heptane.

Subsequently, 392 ml of toluene was placed in the flask and the temperature of the contents was maintained at 85° C. While stirring the contents, 117 ml of n-butyl ether and 3.7 ml of tri-n-octylamine were added thereto, and the resulting mixture was subjected to reaction at 85° C. for 15 minutes. After the reaction, a solution of 15.5 g of iodine in 196 ml of toluene was added to the reaction mixture, and the resulting mixture was further subjected to reaction at 85° C. for 45 minutes.

The reaction mixture was separated into a solid and a liquid, and the solid obtained was then washed with 500 ml of toluene and then three 500-ml portions of n-heptane, and dried under reduced pressure to obtain 90 g of a titanium trichloride-containing solid catalyst. This solid catalyst contained 65.2% by weight of titanium trichloride.

(2) Copolymerization

By using a fluidized bed type reactor having an internal volume of 1 m$^3$ provided with a stirrer, copolymerization of propylene and butene-1 was conducted. First of all, 60 kg of propylene-butene-1 copolymer particles for dispersing catalysts were fed to the reactor, which reactor was then purged with nitrogen and then with propylene. The internal pressure of the reactor was raised to 5 kg/cm$^2$G with propylene, and a circulation gas was fed from the bottom of the reactor at a flow rate of 80 m$^3$/hour to maintain the polymer particles in the fluidized state. Subsequently, the following catalysts were supplied to the reactor, in which the catalyst components (b) and (c) were used in the form of a heptane solution:

| | |
|---|---|
| (a) titanium trichloride-containing solid catalyst | 21 g |
| (b) diethylaluminum chloride | 112 g |
| (c) triethylaluminum | 11 g |
| (d) methyl methacrylate | 8 g |

Subsequently, hydrogen, propylene and butene-1 were fed to said reactor so that the concentrations of hydrogen and butene-1 were 1.7% by volume and 20% by volume, respectively, and the internal pressure of the reactor was raised to 10 kg/cm$^2$G, after which the temperature of the fluidized bed was adjusted to 65° C. to initiate polymerization. During the polymerization, hydrogen, propylene and butene-1 were supplied so as to maintain the concentrations and pressures of hydrogen and butene-1 constant. When 75 kg of a polymer was formed, in addition to the 60 kg of the propylene-butene-1 copolymer initially added to the reactor 60 kg of the polymer particles were left in the reactor for dispersing catalysts for the next polymerization, and the residual polymer particles were transferred to a stirring-mixing tank. To said mixing tank were fed 210 g of propylene oxide and 100 g of methanol, and the resulting mixture was heat-treated at 80° C. for 30 minutes. Subsequently, the treated mixture was dried to obtain a white powdery polymer. In the above reactor, the second and third polymarization procedures with after-treatments were successively carried out under the same conditions as in the first polymerization. The physical properties of the polymer obtained in the third polymerization procedure were measured. Table 1 shows the result.

(3) Lamination and stretching

The copolymer obtained in the above (2) was laminated to a preformed sheet of homopolypropylene having a thickness of 500 μ under the following conditions:
Laminator: Tanabe 40 mmφ Laminator
Temperature: 290° C.
Die: Width 700 mm, Lip clearance 0.5 mm
Discharge speed: 200 g/min
Lamination speed: 9 m/min
Thickness of laminate: 50 μ

The laminated sheet obtained above was cut into a square sample of 90 mm×90 mm and the sample was stretched under the following conditions to obtain a biaxially stretched film:
Stretching machine: A bench biaxial stretching machine, manufactured by Toyo Seiki
Temperature: 150° C.
Preheating time: 3 min
Stretching ratio: Machine direction 5 times, transverse direction 5 times
Stretching speed: 5 m/min The physical properties of the stretched laminated film obtained above having a thickness of about 22μ are shown in Table 2. This stretched laminated film had a very low heat-sealing temperature and yet was good in transparency, blocking resistance and scratch resistance.

EXAMPLE 2

A copolymer was produced with the same catalyst system as in Example 1 under the same polymerization conditions as in Example 1, except that the amounts of butene-1 and hydrogen charged were changed. The basic specifications of this copolymer are shown in Table 1. Using the copolymer, a stretched laminated film was produced under the same conditions as in Example 1. The physical properties of this laminated film are shown in Table 2. This stretched laminated film has as good characteristics as the stretched laminated film of Example 1.

EXAMPLE 3

A copolymer was produced with the same catalyst system as in Example 1 under the same polymerization conditions as in Example 1, except that the amounts of butene-1 and hydrogen charged were changed and ethylene was newly charged. The basic specifications of this copolymer are shown in Table 1.

Using the copolymer, a stretched laminated film was produced under the same conditions as in Example 1. The physical properties of this stretched laminated film are shown in Table 2. The film had as good characteristics as the stretched laminated film of Example 1.

COMPARATIVE EXAMPLE 1

A copolymer was produced with the same catalyst system as in Example 1 under the same polymerization conditions as in Example 1, except that the amount of butene-1 and hydrogen charged were changed and ethylene was newly charged. The basic specifications of the copolymer are shown in Table 1. Using the copolymer, a stretched laminated film was produced under the same conditions as in Example 1. The physical properties of this film are shown in Table 2. The stretched laminated film was poor not only in low-temperature heat-sealability but also in blocking resistance and transparency, and moreover its transparency was deteriorated with the lapse of time.

COMPARATIVE EXAMPLE 2

A copolymer was produced by the slurry polymerization method using n-heptane as a solvent, and hence freed of a large amount of an atactic component soluble in n-heptane. The basic specifications of this copolymer are shown in Table 1. Using this copolymer, a stretched laminated film was produced under the same conditions as in Example 1. The physical properties of this film are shown in Table 2. The stretched laminated film was excellent in transparency, blocking resistance and scratch resistance; however it had no sufficient low-temperature heat-sealability and accordingly did not meet the object of this invention.

COMPARATIVE EXAMPLE 3

A copolymer was produced by the slurry polymerization method using n-heptane as a solvent, and hence freed of an atactic component soluble in n-heptane.

The basic specifications of this copolymer are shown in Table 1. Using this copolymer, a stretched laminated film was produced under the same conditions as in Example 1. The physical properties of this film are shown in Table 2. The stretched laminated film was excellent in transparency, blocking resistance and scratch resistance; however it had a poor low-temperature heat-sealability and accordingly did not meet the object of this invention.

EXAMPLE 4

A copolymer was produced by the slurry copolymerization method using n-heptane as a solvent, and hence freed of an atactic component soluble in n-heptane. The basic specifications of this copolymer are shown in Table 1. Using the copolymer, a stretched laminated film was produced under the same conditions as in Example 1. The physical properties of this film are shown in Table 2. The stretched laminated film was poor not only in lowtemperature heat-sealability but also in transparency and scratch resistance.

COMPARATIVE EXAMPLE 5

A copolymer was produced by the duplication of Example 1 of Japanese Patent Application Kokai (Laid-Open) No. 66,990/79. As described in the Japanese publication, this copolymer had a very low BHIP content of 1% or less. Using the copolymer, a stretched laminated film was produced under the same conditions as in Example 1.

The stretched laminated film was satisfactory in transparency and low-temperature heat-sealability; however it had a very poor blocking reistance of 6.0 kg/12 cm$^2$, and also had a poor scratch resistance which was evaluated as X.

TABLE 1

| Item | Example 1 | Example 2 | Example 3 | Comparative Example 1 | Comparative Example 2 | Comparative Example 3 | Comparative Example 4 |
| --- | --- | --- | --- | --- | --- | --- | --- |
| Butene-1 content (mole %) | 17.3 | 14.6 | 12.5 | 7.5 | 14.0 | 4.5 | — |
| Other olefins content (mole %) | — | — | Ethylene 1.4 | Ethylene 3.7 | — | Ethylene 3.2 | Ethylene 9.5 |
| CXS content (wt %) | 29.6 | 24.8 | 32.7 | 23.3 | 9.3 | 5.5 | 9.6 |
| BHIP content (wt %) | 22.8 | 29.5 | 15.8 | — | — | — | — |
| [η] (dl/g) | 1.9 | 1.8 | 1.9 | 1.8 | 1.9 | 1.9 | 1.8 |
| ΔHaze (%) | 2.0 | 0.3 | 2.8 | 8.5 | 1.4 | 1.0 | 1.2 |

TABLE 2

| Item | Example 1 | Example 2 | Example 3 | Comparative Example 1 | Comparative Example 2 | Comparative Example 3 | Comparative Example 4 |
| --- | --- | --- | --- | --- | --- | --- | --- |
| Heat-sealing temperature (°C.) | <90 | 95 | 92 | 120 | 105 | 128 | 115 |
| Haze (%) | 2.5 | 2.3 | 2.8 | 5.1 | 2.9 | 2.6 | 4.6 |
| Blocking (kg/12 cm$^2$) | 0.2 | 0.2 | 0.2 | 3.2 | 0.1 | 0.1 | 0.3 |
| Evaluation of scratch resistance | o | o | o | o | o | o | Δ |

We claim:

1. A laminated polypropylene film consisting of a crystalline polypropylene layer having laminated to at least one side thereof a layer of a random copolymer of propylene and an α-olefin having 4 or more carbon atoms or a random copolymer of propylene, an α-olefin having 4 or more carbon atoms and ethylene obtained by vapor phase polymerization in the substantial absence of a liquid medium, using the catalyst system which consists essentially of a solid catalyst component, an organoaluminum catalyst and an electron-donating compound, said copolymer satisfying the following conditions (1) to (5):
(1) the content of an α-olefin having 4 or more carbom atoms in the copolymer is 10 to 24 mole %,
(2) the content of ethylene in the copolymer is 3 mole % or less,
(3) the content of a cold xylene-soluble portion in the copolymer is 17 to 50% by weight,
(4) the content of a boiling n-heptane-insoluble portion in the copolymer is 7% by weight or more, and
(5) Δhaze of the copolymer is 4% or less.

2. A laminated polypropylene film according to claim 1, wherein the α-olefin having 4 or more carbon atoms is butene-1.

3. A laminated polypropylene film according to claim 1, whereis a uniaxially or biaxially stretched lamianted film.

4. A laminated polypropylene film according to claim 2, which is a uniaxially or biaxially stretched laminated film.

* * * * *